(12) United States Patent
Lee

(10) Patent No.: US 7,245,445 B2
(45) Date of Patent: Jul. 17, 2007

(54) METHOD OF MANAGING DEFECTS IN HARD DISK DRIVE, RECORDING MEDIA THEREFOR AND HARD DISK DRIVE THEREFOR

(75) Inventor: Seok Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 54 days.

(21) Appl. No.: 10/704,917

(22) Filed: Nov. 12, 2003

(65) Prior Publication Data

US 2004/0190185 A1 Sep. 30, 2004

(30) Foreign Application Priority Data

Nov. 25, 2002 (KR) ...................... 10-2002-0073481

(51) Int. Cl.
*G11B 5/09* (2006.01)
(52) U.S. Cl. ..................................... 360/48
(58) Field of Classification Search .................. 360/48, 360/45, 53, 51, 75; 711/4, 162; 714/710, 714/8, 5; 369/53.16, 47.14, 53.15
See application file for complete search history.

(56) References Cited

U.S. PATENT DOCUMENTS

| | | | | |
|---|---|---|---|---|
| 5,258,876 A | * | 11/1993 | Danner et al. ................. | 360/45 |
| 5,271,018 A | * | 12/1993 | Chan ........................... | 714/710 |
| 5,367,652 A | * | 11/1994 | Golden et al. ................. | 711/4 |
| 5,526,335 A | * | 6/1996 | Tamegai ................... | 369/53.16 |
| 5,784,216 A | * | 7/1998 | Zaharris ...................... | 360/48 |
| 5,818,654 A | * | 10/1998 | Reddy et al. ................. | 360/53 |
| 5,822,142 A | * | 10/1998 | Hicken ......................... | 360/53 |
| 5,956,309 A | * | 9/1999 | Yamamuro ............... | 369/47.14 |
| 6,189,110 B1 | * | 2/2001 | Saitoh et al. ................. | 714/8 |
| 6,195,218 B1 | * | 2/2001 | Guttmann et al. ........... | 360/51 |
| 6,223,303 B1 | * | 4/2001 | Billings et al. ............... | 714/8 |
| 6,263,459 B1 | * | 7/2001 | Schibilla ..................... | 714/710 |
| 6,279,089 B1 | * | 8/2001 | Schibilla et al. ........... | 711/162 |
| 6,324,660 B1 | * | 11/2001 | Majima et al. ............. | 714/710 |
| 6,384,999 B1 | * | 5/2002 | Schibilla ...................... | 360/53 |
| 6,411,458 B1 | * | 6/2002 | Billings et al. ............. | 360/75 |
| 6,442,715 B1 | * | 8/2002 | Wilson ....................... | 714/710 |
| 6,556,369 B1 | * | 4/2003 | Kanamaru et al. ........... | 360/75 |
| 6,563,776 B1 | * | 5/2003 | Oi et al. .................. | 369/53.15 |
| 6,606,714 B1 | * | 8/2003 | Thelin ........................... | 714/8 |

(Continued)

FOREIGN PATENT DOCUMENTS

JP 6-119717 4/1994

(Continued)

OTHER PUBLICATIONS

Japanese Office Action for Application No. 2003-394022 corresponding to the above-mentioned U.S. Appl. dated, May 2, 2006.

*Primary Examiner*—Fred F. Tzeng
(74) *Attorney, Agent, or Firm*—Staas & Halsey LLP

(57) ABSTRACT

A method of managing defects in a hard disk drive, and more particularly, a method of managing defects in a hard disk drive in a case where a position of defects on a disk is known in advance. A data zone is allocated to predetermined tracks around tracks including defects known in advance, and the data zone is managed for defects.

18 Claims, 13 Drawing Sheets

U.S. PATENT DOCUMENTS

| | | |
|---|---|---|
| 6,658,588 B1 * | 12/2003 | Ko .................... 714/5 |
| 6,658,593 B1 * | 12/2003 | Ko .................... 714/8 |
| 6,747,825 B1 * | 6/2004 | Ng et al. ............. 360/48 |
| 6,791,778 B2 * | 9/2004 | Chu et al. ........... 360/53 |

FOREIGN PATENT DOCUMENTS

| | | |
|---|---|---|
| JP | 1996-235780 | 9/1996 |
| JP | 09-319625 | 12/1997 |
| JP | 10-134516 | 5/1998 |
| JP | 11-66709 | 3/1999 |
| JP | 11-297006 | 10/1999 |
| JP | 2000-105980 | 4/2000 |
| JP | 2000-105986 | 4/2000 |
| JP | 2000-268516 | 9/2000 |
| JP | 2000-293954 | 10/2000 |
| JP | 2001-195836 | 7/2001 |
| JP | 2002-279635 | 9/2002 |

* cited by examiner

DISK
ZONE n
SPARE AREA IN ZONE n

DISK
SPARE AREA

> BEFORE SLIP IS GENERATED

| Cyl 100 | D0 | D1 | D2 | D3 | D4 | ... | D699 | D700 | D701 |

| Spare | S0 | S1 | S2 | S3 | S4 | S5 | S6 | S7 | S8 |

> AFTER SLIP IS GENERATED

| Cyl 100 | D0 | | D1 | D2 | D3 | ... | D698 | D699 | D700 |

| Spare | D701 | S0 | S1 | S2 | S3 | S4 | S5 | S6 | S7 |

METHOD OF MANAGING DEFECTS IN HARD DISK DRIVE, RECORDING MEDIA THEREFOR AND HARD DISK DRIVE THEREFOR

CROSS-REFERENCE TO RELATED APPLICATIONS

This application claims the benefit of Korean Patent Application No. 2002-73481, filed on Nov. 25, 2002, in the Korean Intellectual Property Office, the disclosure of which is incorporated herein by reference.

BACKGROUND OF THE INVENTION

1. Field of the Invention

The present invention relates to a method of managing defects in a hard disk drive, and more particularly, to a method of managing defects in a hard disk drive in a case where the position of defects on a disk is known in advance, a recording medium therefor, and a hard disk drive therefor.

2. Description of the Related Art

A head in a hard disk drive is movable using a stepping motor or a voice coil motor. The stepping motor is mainly used in a floppy disk drive. In this case, the head is moved via a drive shaft which steps a precise distance. On the other hand, in the case of using a voice coil motor, the head is moved in response to a specific signal written on a disk, such as a servo signal.

In the case of a hard disk drive, one section (platter) of a disk is used for the servo signal and an additional head for reading the servo signal is provided in the hard disk drive. This method is used only for reading the servo signal.

In an embedded servo method which is more commonly used, a servo signal is written on a track of a disk so that all platters on the hard disk drive are useable for data storage. Thus, a head in the embedded servo method can read the servo signal as well as data.

In the method using the voice coil motor, the head is more correctly accessed than in the method using the stepping motor, and an access time is shortened. In particular, in a case of the embedded servo method, the correction of an off-track is performed in real-time, and a disk is useable in many fields.

In the case of the embedded servo method, the servo signal is written on the disk using a servo write process in a hard disk drive manufacturing process. The servo signal is written on the disk using equipment such as a servo writer, or by self servo writing.

In a conventional hard disc drive, a servo signal is written on a disk by moving a head either from an outer diameter (OD) to an inner diameter (ID) of the disk or from an ID to an OD of the disk, that is, in a single direction. Recently, a method of writing a servo signal in a direction in which the writing direction of the servo signal varies in a middle area (an area where a skew angle is 0) of the disk, i.e., a method of writing a servo signal bidirectionally, taking an effect caused by a skew angle into account, has been used.

However, in the method of writing a servo signal bidirectionally, due to limitations such as the accuracy of a servo writer, the portion where the skew angle is 0 is not correctly recognized. Thus, an area (hereinafter, referred to as an alternate write area) where the servo signal is alternately written on a disk inevitably occurs in the vicinity of a place where the writing direction of the servo signal is reversed. Servo data may be abnormally written in the alternate write area.

To solve this problem, in a conventional method of managing defects in a hard disk drive, a data zone is divided centering on a track where the writing direction of the servo signal is reversed, and an alternate write area is divided and allocated to adjacent data zones, and an area corresponding to the alternate write area in an area in the data zone is managed for track defects.

In the above-described method, the alternate write area must be checked during a process of inspecting defects in a hard disk drive manufacturing process, and since a large amount of time is required for defect inspection, the hard disk drive production rate is reduced.

In addition, in one data zone adjacent to the alternate write area, part of the alternate write area is allocated to a spare area, and the spare area is managed for defects. Thus, a capacity of managing defects in the data zone is reduced as much as the defect-managed spare area. In another data zone adjacent to the alternate write area, part of the alternate write area is allocated to a data area, and the data area is managed for defects. Thus, the capacity of the data zone is reduced as much as the defect-managed data area. Further, as the recording density of a disk increases, the number of track defects to be managed for defects increases. Thus, these problems cannot be solved by using an existing spare area.

SUMMARY OF THE INVENTION

The present invention provides a method of managing defects in a hard disk drive in a case where the position of defects on a disk is known in advance.

The present invention also provides a recording medium on which code segments of the method of managing defects in a hard disk drive are stored.

The present invention also provides a disk drive which uses the method of managing defects in a hard disk drive.

According to an aspect of the present invention, there is provided a method of managing defects in a hard disk drive in a case where a position of defects on a disk is known in advance. The method comprises allocating a data zone to tracks including defects known in advance, and managing the data zone for defects.

In the managing of the data zone for defects, the data zone may be managed for a defective zone on a zone map having information comprising a recording frequency of the zone and a sector number per track.

According to another aspect of the present invention, there is provided a method of managing defects in a hard disk drive in a case where a position of defects on a disk is known in advance. The method comprises setting data zones on the disk, and making a zone map which represents a correlation between a servo track number and a data track number in each of the data zones and allocating data tracks except for a predetermined number of servo tracks around tracks of which the position of defects is known in advance.

According to another aspect of the present invention, there is provided a computer readable recording medium which stores a method of managing defects in a hard disk drive in a case where position of defects on a disk is known in advance. The method comprises setting a data area for each zone on a disk and allocating an additional data zone to predetermined tracks around tracks of which position of defects is known in advance, and managing the data zone allocated to the predetermined tracks around the tracks for defects.

According to another aspect of the preset invention, there is provided a computer readable recording medium which stores a method of managing defects in a hard disk drive in a case where position of defects on a disk is known in advance. The method comprises setting data zones on a disk, and making a zone map which represents a correlation between a servo track number and a data track number in each of the data zones and allocating data tracks except for a predetermined number of servo tracks around tracks of which the position of defects is known in advance.

According to another aspect of the present invention, there is provided a hard disk drive. The hard disk drive comprises a disk, a spindle motor which rotates the disk, a head which writes information on the disk and reads the information from the disk, a voice coil motor which moves the head, and a controller which controls the voice coil motor to set a data area for each zone on the disk, allocating an additional data zone to predetermined tracks around tracks of which the position of defects is known in advance, and managing the data zone allocated to the predetermined tracks around the tracks of which the position of defects is known in advance, for defects.

According to another aspect of the present invention, there is provided a hard disk drive. The hard disk drive comprises a disk, a spindle motor which rotates the disk, a head which writes information on the disk and reads the information from the disk, a voice coil motor which moves the head, and a controller which controls the voice coil motor to set a data area for each zone on the disk, making a zone map which represents a correlation between a servo track number and a data track number in each of the data zones, and allocates data tracks except for a predetermined number of servo tracks around tracks of which the position of defects is known in advance.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
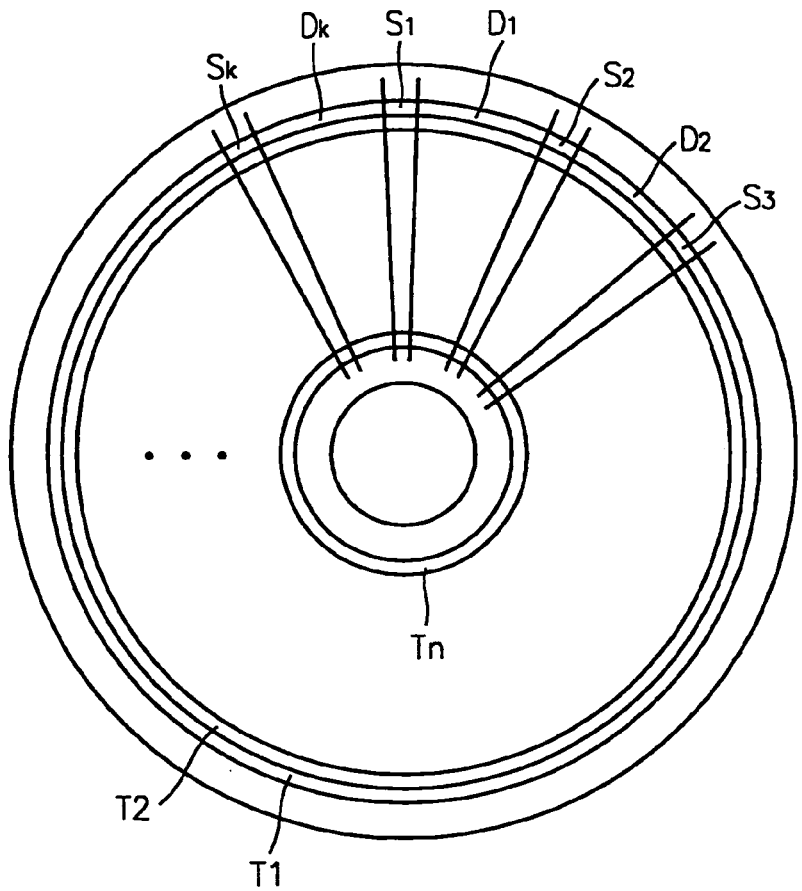
FIG. 1 shows circular tracks, servo areas and data areas of a disk in a hard disk drive.

Reference will now be made in detail to the embodiments of the present invention, examples of which are illustrated in the accompanying drawings, wherein like reference numerals refer to the like elements throughout. The embodiments are described below to explain the present invention by referring to the figures.

In the present invention, a defective area is set to an additional data zone, to prevent a user's access to the defective area, and the additional data zone is managed for a defective zone (first embodiment), or a data track is not allocated to the defective area (second embodiment).

FIG. 1 shows areas of a disk in a hard disk drive. The disk comprises a plurality of concentric circular tracks indicated by reference numerals T1 through Tn. Each of the plurality of concentric circular tracks T1 through Tn includes servo areas indicated by reference numerals S1 through Sk and data areas indicated by reference numerals D1 through Dk. A servo signal is written in each servo area. The servo signal is used to recognize the position of a head to write or read data on or from the disk.

Figure 2:
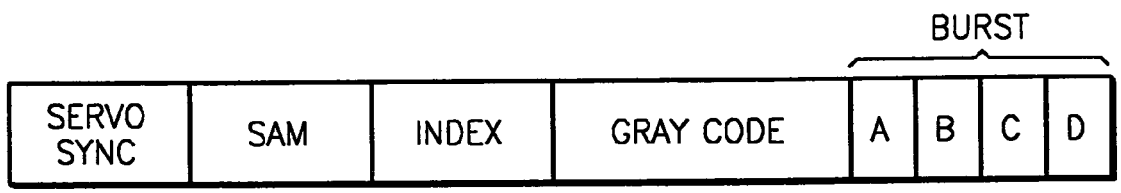
FIG. 2 schematically shows an example of a servo signal written in a servo area shown in FIG. 1.

FIG. 2 schematically shows an example of a servo signal written in a servo area shown in FIG. 1. The servo signal comprises a servo sync signal, a servo address mark (SAM), an index, a gray code, and burst signals A, B, C, and D. The servo sync signal has a regular frequency to recognize the servo address mark (SAM) and is written in an initial portion of the servo area. The SAM has a specific pattern which cannot be generated in the data area. A time when the SAM is detected is a basis for servo control. The gray code is a code for indicating the position of a track on a disk. The burst signals A, B, C, and D are signals for indicating the position of a head in the track.

The servo signal is important for controlling the position of the head on the disk and is mainly used in a track seek or following operation. Thus, when the servo signal is damaged, the hard disk drive cannot operate normally.

Figure 3:
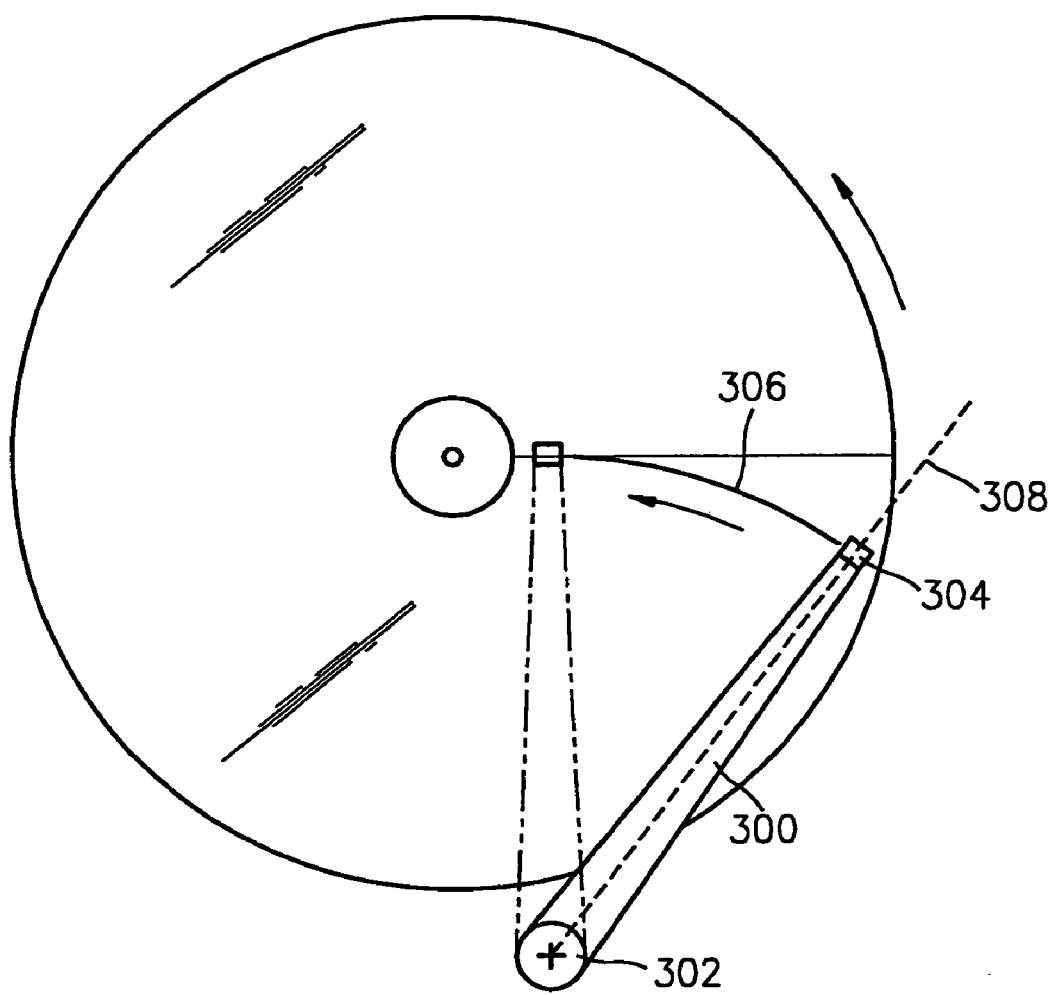
FIG. 3 is a plan view of a disk showing a moving locus of a head on a surface of the disk.

FIG. 3 is a plan view of a disk showing a moving locus of a head on the surface of the disk. The servo signal is written on the disk by a head 304 provided at the end of an actuator 300 which moves centering on a pivot 302. The actuator 300 enables the head 304 to move on the disk along a head locus 306.

In this case, an angle formed by a longitudinal axis 308 of the head 304 and the actuator 300 and a tangent line of a track, that is, a skew angle, varies according to the position of the head 304. As such, a write section of the servo signal written by the head 304 varies due to the skew angle.

Figure 4A:
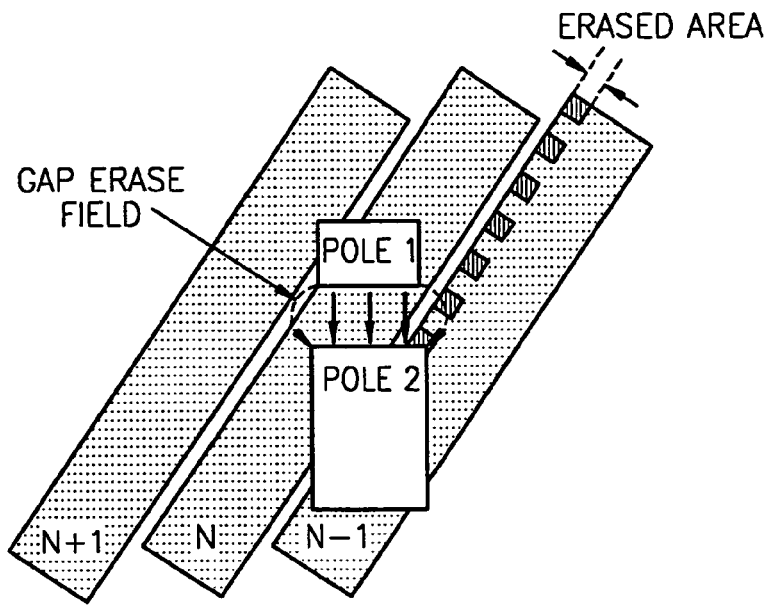
FIGS. 4A and 4B show effects caused by a gap erase field on adjacent tracks when servo information is written on the disk.
Figure 4B:
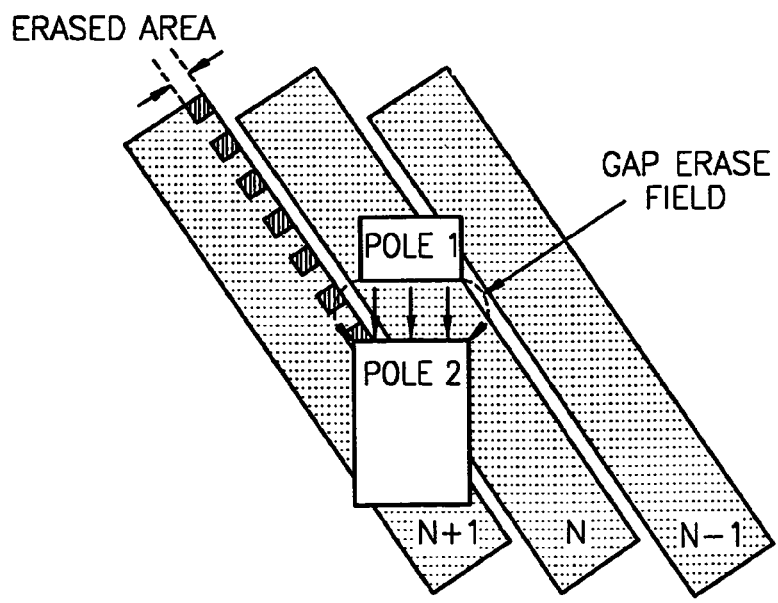

FIGS. 4A and 4B show effects caused by a gap erase field on adjacent tracks when the servo signal is written on the disk. In general, the head 304 comprises a magnetic-induction type head (write head) for recording data on the disk and a magneto-resistive (MR) head (read head) for reading data from the disk. In a write mode, as shown in FIGS. 4A and 4B, a magnetic field is formed between poles 1 and 2 of the magnetic-induction type head, thereby magnetizing the disk.

However, when the magnetic field is formed between the poles 1 and 2 as shown in FIGS. 4A and 4B, an undesired gap erase field is additionally generated. This greatly affects adjacent tracks as a track per inch (TPI) increases in a high density recording apparatus.

In a conventional servo write process, a track number is sequentially increased from a track number 0 on an outer diameter (OD) of the optical disk to an inner diameter (ID) of the disk, and servo information is written on the disk. However, as the head is located at the outer diameter (OD), a middle diameter (MD), and the inner diameter (ID) of the disk, the head has a positive skew, a zero skew, and a negative skew, respectively.

As shown in FIG. 4B, when the servo information is written on an N-th track on the OD of the disk in the direction of a '0' skew, the head has the positive skew, and the additionally-generated gap erase field affects an (N+1)-th track. However, since the servo information has not yet been written on the (N+1)-th track, and the servo information will be written on the (N+1)-th track after the servo information is written on the N-th track, the gap erase field does not affect the servo information of an adjacent field until the '0' skew from the OD of the disk.

However, as shown in FIG. 4A, the head starts to have a negative skew while passing the '0' skew. This affects the servo information written on a (N−1)-th track when the gap erase field writes the servo information on the N-th track. The effect of the gap erase field leads a reduction in a width of an already-written signal, and thus, the strength of the servo signal is rapidly reduced in a track after the '0' skew.

The reduced strength servo signal is sensitive to noise. The noisy servo signal may be converted into a wrong track value or position error signal (PES) during A/D conversion, and thus, a normal servo control (seek or following) operation is not correctly performed.

A technology directed to this problem is disclosed in Japanese Patent Publication No. 2001-189062 titled "Disk Memory and Method for Writing Servo Data". Here, in order to reduce the effect of a gap erase field, servo information is written in a radial direction from one of an ID or OD of a disk, and a writing direction of the servo information is reversed in a middle area where a skew of a write head is '0'.

Figure 5:
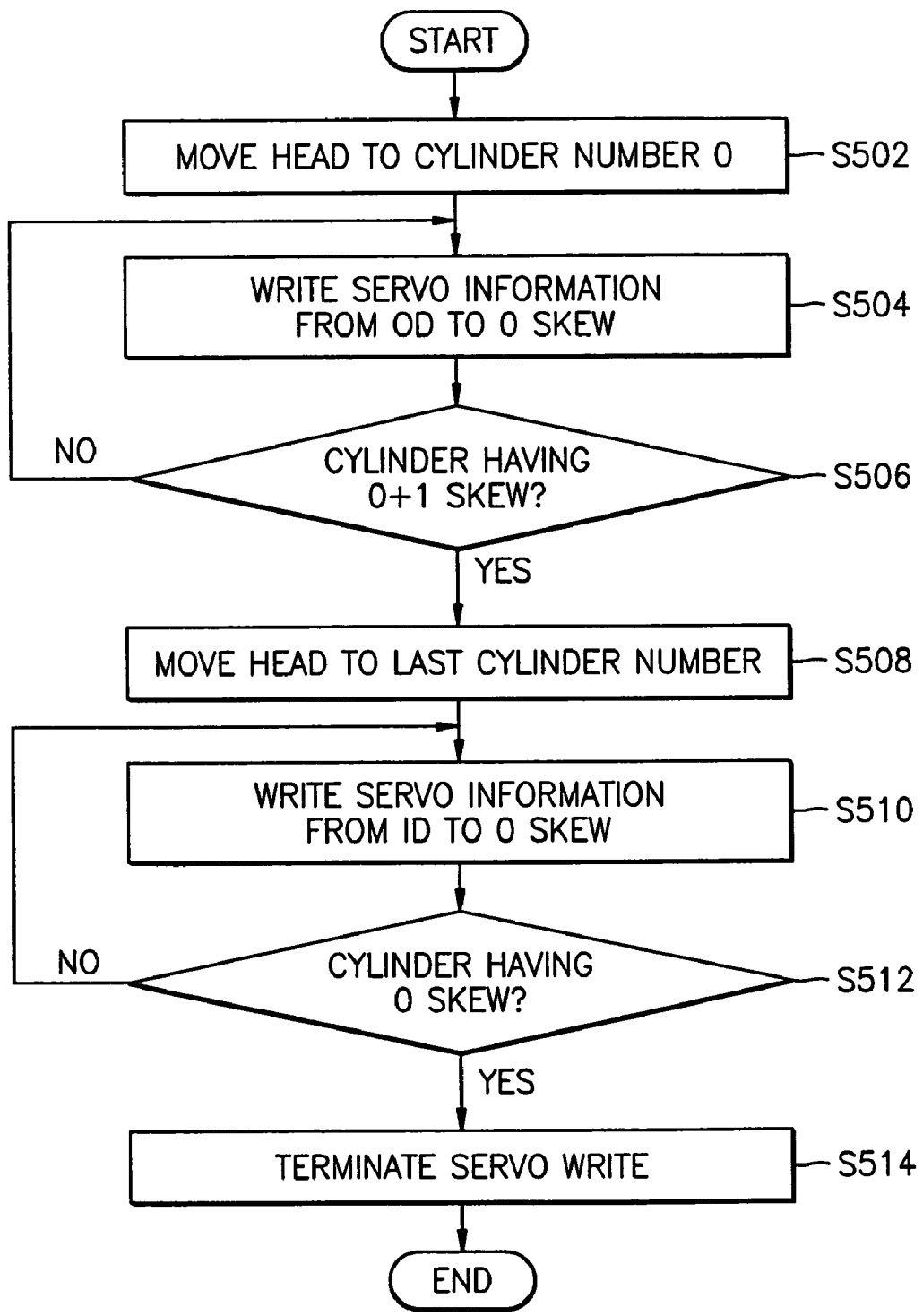
FIG. 5 schematically shows a method of writing a servo signal bidirectionally disclosed in Japanese Patent Publication No. 2001-189062.

FIG. 5 schematically shows a method of writing a servo signal bidirectionally as disclosed in Japanese Patent Publication No. 2001-189062. In operation S502, in a servo information write mode, a head is moved to a '0' track on an OD of a disk. After that, in operation S504, servo information is written from the '0' track to a track having a '0' skew.

In operation S506, the servo information is sequentially written on the track having the '0' skew, and it is determined whether a current track at which the head is located reaches a track having a '0+1' skew (a next track after the track having the '0' skew). This is because it is determined whether writing of the servo information is completed from the '0' track of the disk to the track having the '0' skew.

As a result of the determination in operation S504, if the head does not reach the track having the '0+1' skew, the method returns to operation S502, and the servo information is continuously written while the track number is sequentially increased. If the head reaches the track having the '0+1' skew, in operation S508, the head is moved to a last track (maximum number) on the ID of the disk. After that, in operation S510, the servo information is written while the track number is reduced from the last track to the track having the '0' skew.

In operation S512, the servo information is written from the ID of disk to the track having the '0' skew, and it is determined whether the position of a current track reaches the track having the '0' skew. This is because it is determined whether writing of the servo information is completed from the track having the maximum number of the ID of the disk to the track having the '0+1' skew.

As a result of determination in operation S512, if the head does not reach the track having the '0' skew, the method returns to operation S510, and the servo information is continuously written while the track number is sequentially reduced. If the head reaches the track having the '0' skew, in operation S514, the servo information has been written on all of the tracks, and thus, writing of the servo information is terminated.

In Japanese Patent Publication No. 2001-189062, as shown in FIG. 5, the effect of adjacent tracks caused by the gap erase field may be minimized. However, as shown in FIG. 6, servo data are abnormally written in an alternate write area and alternately between tracks X and Y, in a middle area where the writing direction of servo data is reversed due to the accuracy of a servo track writer.

Figure 7:
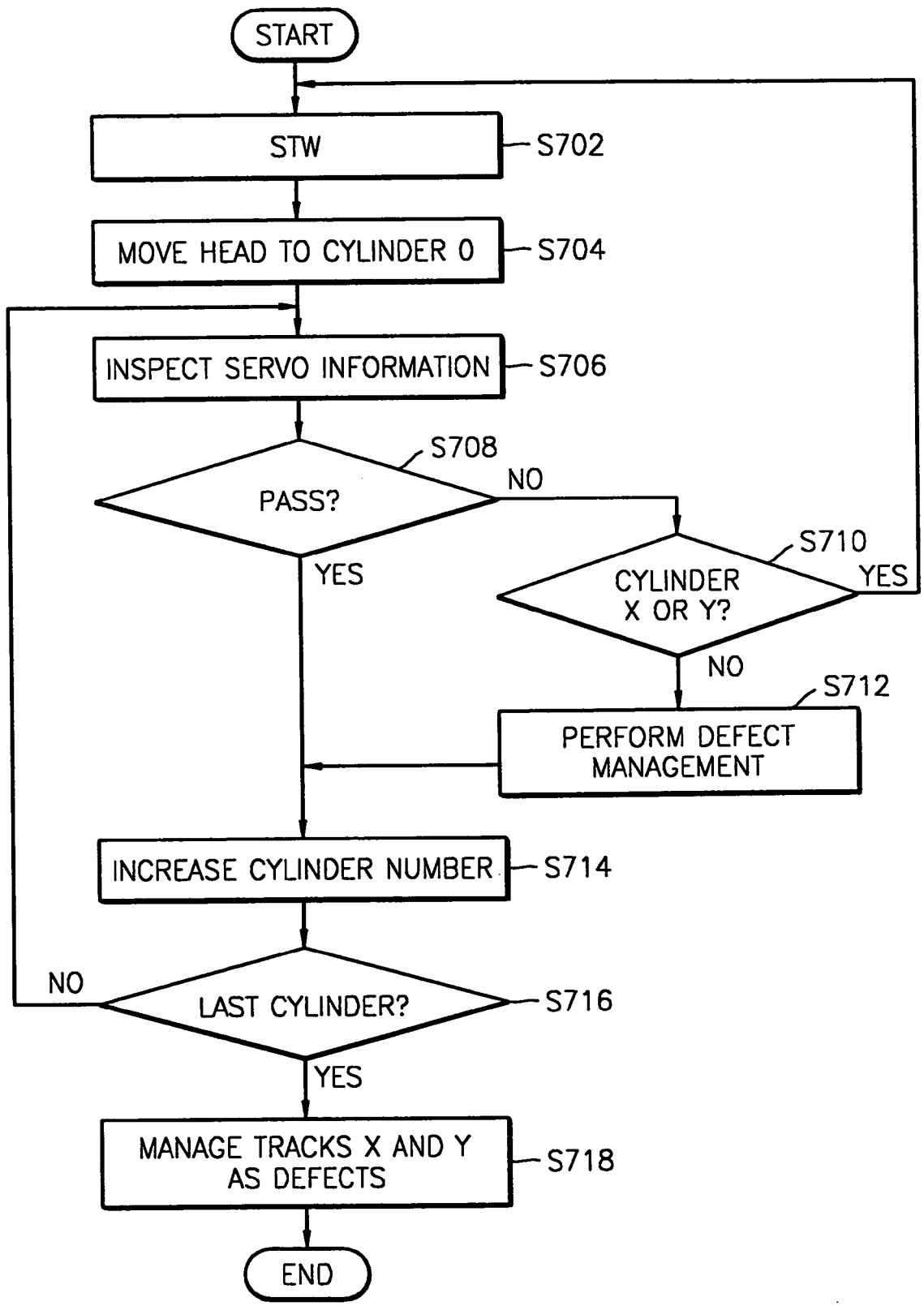
FIG. 7 is a flowchart showing a conventional method of managing disk defects adopted in the method of writing a servo signal bidirectionally.

FIG. 7 is a flowchart showing a conventional method of managing defects adopted in the method of writing a servo signal bidirectionally, disclosed in Korean Patent Application No. 2002-49427 to the applicant of the present invention, published on Aug. 21, 2002. In the method of Korean Patent Application No. 2002-49427, in order to solve a problem caused by the alternate write area inevitably occurring in the method of writing a servo signal bidirectionally, processes for inspecting and managing defects shown in FIG. 7 are performed in a hard disk drive manufacturing process.

Figure 6:
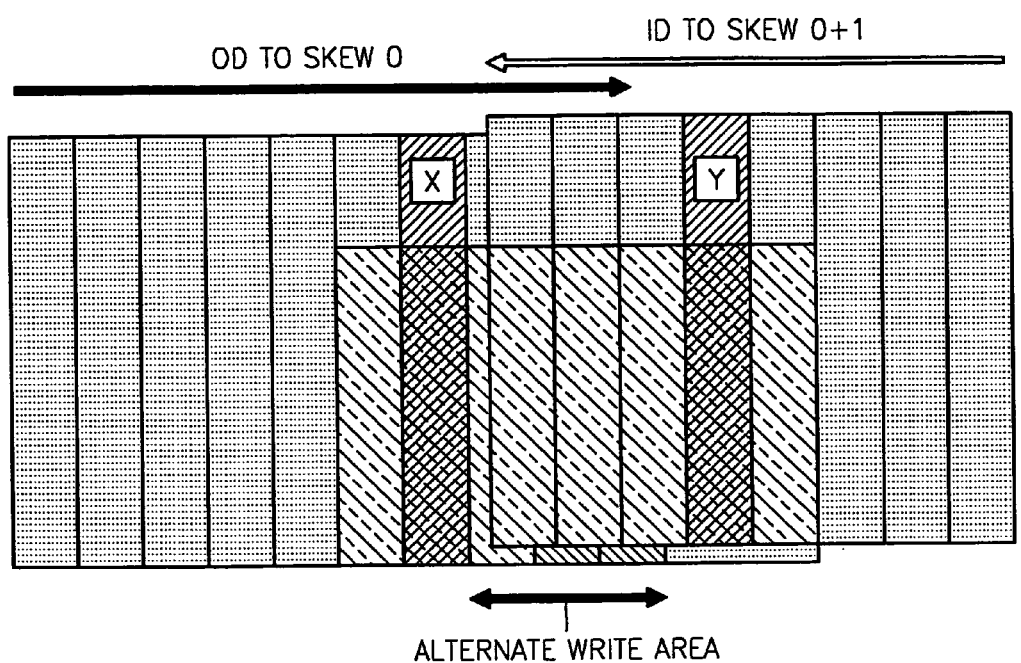
FIG. 6 shows the disk written using the method of writing a servo signal bidirectionally shown in FIG. 5.

In operation S702, before defects management is performed, servo information is written on a track using the method shown in the flowchart of FIG. 6. After writing of the servo information is completed, in operation S704, a head is moved to a '0' track.

After the head is moved to a '0' track, in operation S706, a track number is increased, and it is inspected whether the written servo information is normal. The normality of the servo information written on the track is determined by whether a gray code, a servo address mark (SAM), and burst information are normal.

As a result of inspection in operation S706, if abnormality occurs in the written servo information, in operation S710, it is determined whether a track where abnormality occurs corresponds to a track (track X or Y of FIG. 5) at regular intervals from the track having the '0' skew. Here, the regular intervals are determined by considering the accuracy of a hard disk drive, in particular, the accuracy of a push pin for moving the head and an MR skew (the skew of the magneto-resistive element).

As a result of the determination in operation S710, the case where a servo information error occurs in the track X or Y corresponds to the case where the servo information is excessively overwritten. Thus, the method returns to operation S702, and recording of the servo information is performed as shown in the flowchart of FIG. 6.

If the track where abnormality occurs corresponds to the track X or Y, in operation S712, a corresponding track where the servo information error occurs is managed for defects. As a result of determination in operation S708, in operation S714, if abnormality of the servo information does not occur in the corresponding track, the track number is increased.

After inspecting of the servo information on a last track is terminated, in operations S716 and S718, tracks X and Y are managed for track defects. This is because, if the alternate write area exists, track information is nonlinearly increased, a large error occurs between a track followed by a servo controller and a current track during a seek operation at short intervals of the alternate write area, and thus, a normal seek operation performs normally. That is, if the seek operation is performed at over regular intervals, tracks X and Y at proper intervals are selected and managed for track defects so that there is a time for compensating a difference between the followed track and the current track.

In this case, if the managed track defects exist in the same data zone, it is difficult to maintain a proper bit per inch (BPI), compared with other data zones. Thus, the track having the '0' skew is located at a boundary between data zones such that the track defects are distributed over two data zones and managed.

As a result of servo information inspection described above, if abnormality occurs in the servo information written on a track at regular intervals from the track having the '0' skew, the alternate write area exceeds a design specification, and thus, a servo track write operation is performed again. If abnormality does not occur in the servo information written on the track at the regular intervals from the track having the '0' skew, a track within the regular intervals from the track having the '0' skew is managed for track defects.

However, in the conventional method of managing defects in the hard disk drive shown in FIG. 7, the tracks in the alternate write area have to be checked one by one, and thus, a large amount of time for inspecting defects is required in the hard disk drive manufacturing process.

In addition, the alternate write area is allocated to spare area and data area of adjacent data zones, and the spare area and the data area are managed for defects. Thus, the capacity of defect management of the data zone may be reduced, or the capacity of data may be reduced.

Unlike a floppy disk, data is written with a frequency increasing from the center of a disk by dividing the disk into several circular areas so that an entire area of the disk has a uniform recording density. Each of the divided areas is referred to as a zone, and each zone contains several pieces of information such as a recording frequency of the zone and the sector number per track. This information is referred to as a zone map.

A hard disk drive manufacturing process includes a process for providing a hard disk drive having no defects by seeking defects on the disk in advance and forbidding a user to use the position of defects. This process is referred to as a process for detecting defects. These processes for detecting and managing defects are disclosed in Japanese Patent Publication Nos. 1994-119717 (published on Apr. 28, 1994), 1996-235780 (published on Sep. 13, 1996), 1998-134516 (published on May 22, 1998), 1999-66709 (published on Mar. 9, 1999), 2000-105980 (published on Apr. 11, 2000), 2000-293954 (published on Oct. 20, 2000), and 2001-195836 (published on Jul. 19, 2001). In order to replace defects detected in these processes, a redundant area must be provided in each zone.

Figure 8A:
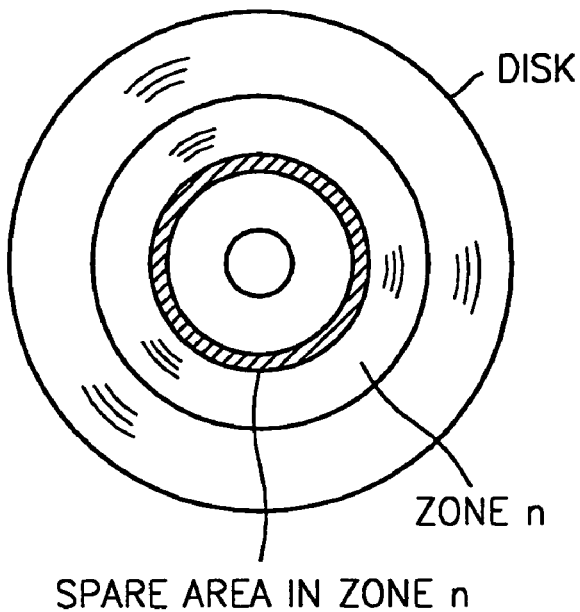
FIGS. 8A and 8B show diagrams for explaining a method of using a zone and a spare area on the disk, respectively.
Figure 8B:
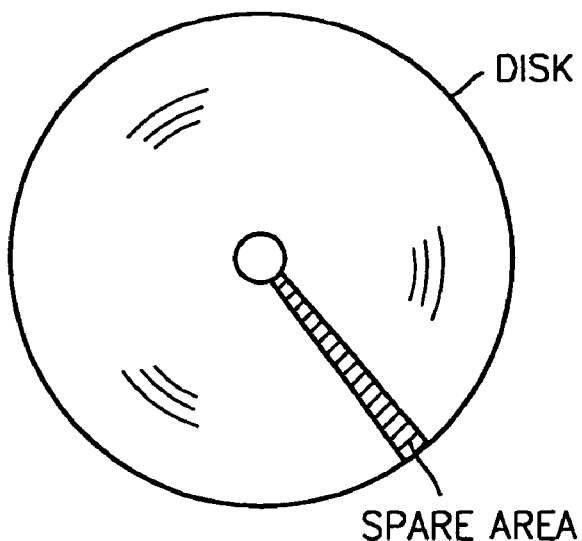

FIGS. 8A and 8B show diagrams for explaining a method of using a zone and a spare area on the disk, respectively.

The spare area is used for two purposes. The first purpose is to use the spare area as a spare area for each zone shown in FIG. 8A, and the second purpose is to use the spare area as a spare area for each track shown in FIG. 8B.

The spare area for each zone is formed by dividing concentric circular tracks into several areas (zones) and placing a spare area indicated by a hatched portion of FIG. 8 in each zone. Thus, the spare area is composed of a plurality of tracks located at the innermost diameter of the disk in each zone, for easy access. The spare area for each track is formed by placing a spare area indicated by a hatched portion of FIG. 8B on each track. Thus, the spare area is composed of a plurality of sectors on each track.

A method of managing defects may be divided into a slip method and a reallocation method. In the slip method, defects detected in the hard disk drive manufacturing process are managed, and when defects are detected, addresses are slipped one by one from a sector just before a defected sector to a spare area so that a defected sector is not accessed.

In the reallocation method, defects occurring while a hard disk drive is used are managed, and when defects are detected, a defected sector is replaced with a spare sector placed on a spare track so that the defected sector is not accessed.

Figures 9, 10:
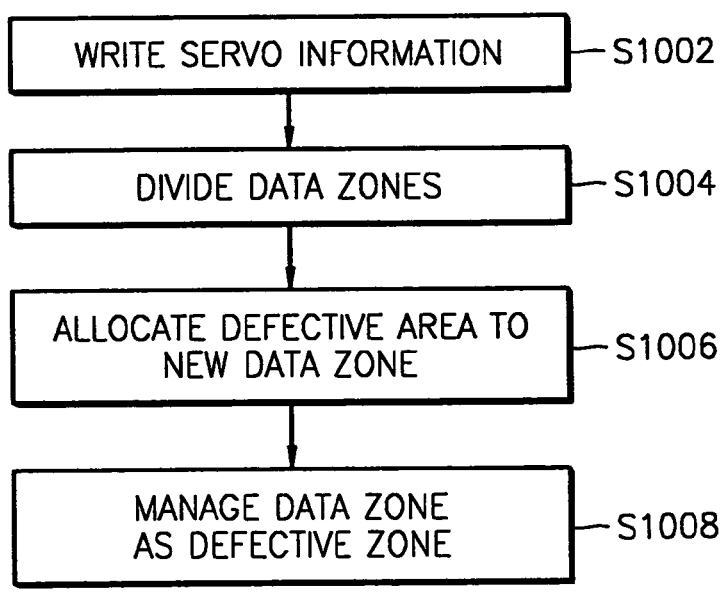
FIG. 9 shows a diagram for explaining a slip method, wherein an upper side shows the state before a slip is generated and a lower side shows the state after the slip is generated.
FIG. 10 is a flowchart showing a method of managing defects in a hard disk drive according to a first embodiment of the present invention.

FIG. 9 shows diagrams for explaining a slip method, wherein an upper side shows the state before a slip is generated and a lower side shows the state after the slip is generated. The upper side of FIG. 9 shows concentric tracks stretched in a straight line. Reference numerals D0-D701 and S0-S8 denote data sectors and spare sectors, respectively. In addition, adjacent sectors have consecutive serial numbers.

The defected sector D1, which is the hatched portion on the upper side of FIG. 9, has to be replaced with the spare sector in the spare area. In the slip method, the defected sector D1 is replaced with the spare sector by the following process:

1) The defected sector D1 is replaced with an adjacent sector D2, and an address of the defected sector D1 is allocated to the adjacent sector D2;
2) The adjacent sector D2 is replaced with another adjacent sector D3, and an address of the adjacent sector D2 is allocated to the adjacent sector D3. This method is performed by all of sectors in the data area; and
3) As a result of replacement with adjacent sectors in the data area, there are no more sectors to be allocated to the data area. As such, a last sector D701 in the data area is replaced with a first sector S1 in the spare area.

The lower side of FIG. 9 shows the state after the slip is generated. A sector indicated by a black block in the data area on the lower side of FIG. 9 represents a defect-managed sector that is not used any more. In addition, a curved arrow shows that the defected sector D1 is replaced with the adjacent sector D2 and the adjacent sector D2 is accessed by the address of the defected sector D1.

In the slip method, the defected sectors are consecutively placed, and thus, all of the sectors are accessible by performing one seek operation. When defects exceeding the capacity of the spare area are detected in each zone, drive is managed for defects.

Defect detection is performed in consecutive detailed operations. If many defects are found in all operations of defect detection, a redundant area where defects may be accommodated is reduced in back operations. Consequently, defects are increased to exceed the redundant area for each zone, and thus, the disk drive is managed for defects.

In particular, the size of the alternate write area obtained in the method of writing a servo signal bidirectionally is increased as an MR skew depending on a distance between a write head and a read head and the position of a head becomes larger than a recording density. Thus, as the recording density of the disk increases, a large number of tracks have to be managed for defects.

FIG. 10 is a flowchart showing a method of managing defects in a hard disk drive according to a first embodiment of the present invention. Before defect management is performed, in operation S1002, servo information is written on a track. In this case, a servo track number is consecutively set in an entire area of a disk.

In operation S1004, the disk is divided into a plurality of data zones. In this case, the servo track number and a data track number are consecutively set in the entire area of the disk. In operation S1006, a defective area is allocated to a new zone.

Specifically, a predetermined area is regarded as a defective area at ID and OD of the disk centering on a track of which position of defects is known in advance, and the predetermined area is allocated to one data zone. The defective area is mechanically determined in advance by considering an MR skew of a track of which position of defects is known in advance, and the accuracy of a servo writer when a predetermined area is allocated to the ID and OD of the disk centering on the track of which position of defects is known in advance.

Figure 11A:
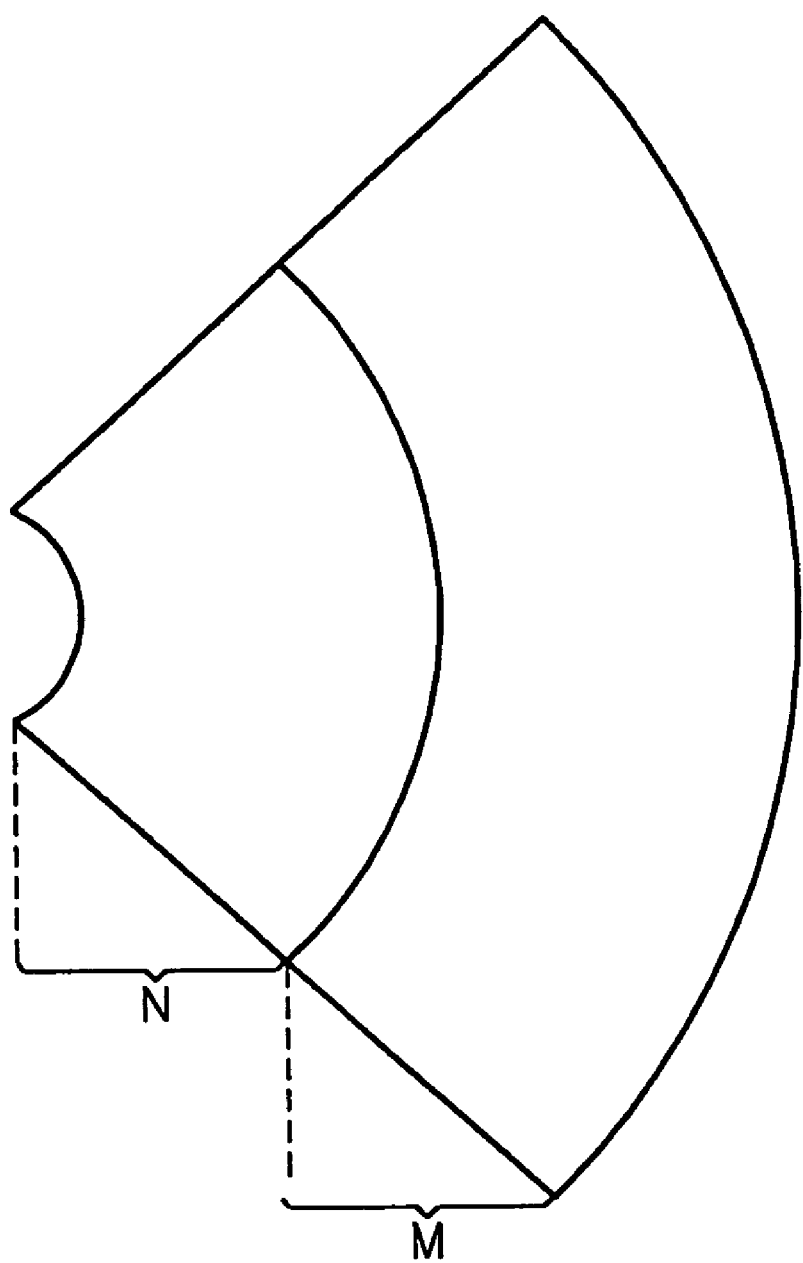
FIGS. 11A and 11B show the results of data zone division performed in operations S1004 and S1006 shown in FIG. 10, respectively.
Figure 11B:
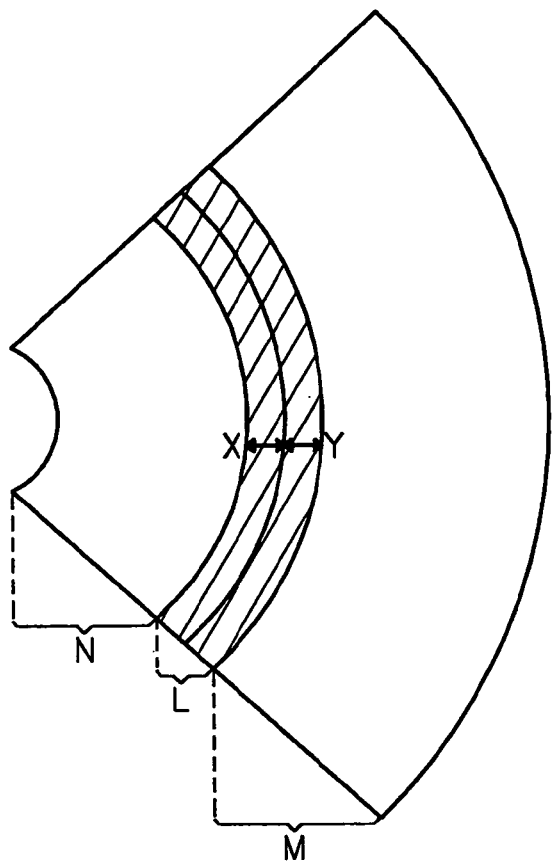

FIGS. 11A and 11B show results of the data zone division performed in operations S1004 and S1006, respectively, shown in FIG. 10. In FIG. 11A, the disk is divided into a plurality of data zones. Zones N and M are divided, centering on the track of which the position of defects is known in advance. Actually, it does not matter that the track of which the position of defects is known in advance is included in one of the divided zones. However, preferably, the data zones are divided centering on the track of which the position of defects is known in advance by considering the balance of a BPI between zones.

In FIG. 11B, the defective area including the track of which the position of defects is known in advance is allocated to a new data zone (zone L). That is, the zone L becomes the defective area.

In operations S1008, the data zone (zone L of FIG. 11B) allocated to the defective area is managed for defects. That is, the defective area is managed for a defective zone so that a user cannot access the defective area. Specifically, the number of logical block addresses (LBAs) of the defective zone is set to 0 so that a host cannot access the defective zone.

Here, defect management is performed on the zone map, and thus, in the process for detecting defects, there is no need to take measures for the defective zone (zone L indicated by a hatched portion of FIG. 11B). As such, a time required for the process for detecting defects is reduced accordingly.

As disclosed in Korean Patent Application No. 2002-49427, by allocating a circumference of the track of which position of defects is known in advance to one new data zone and forbidding a user's access in the defective area, instead of reducing the allowable capacity of defects of the data zone reduced by managing the defective area for defects of the spare area, the spare area for each zone is useable for defects detected in the other operations of detecting defects. However, in the method of managing defects in a hard disk drive according to the first embodiment of the preset invention, if the position of defects is known in advance, the spare area for each zone is not used.

In the first embodiment, the defective area is managed for defects on the zone map, and thus, in the process for detecting defects, defect management is not performed in the defective area. Thus, a time required for the process for detecting defects is greatly reduced.

Figure 12:
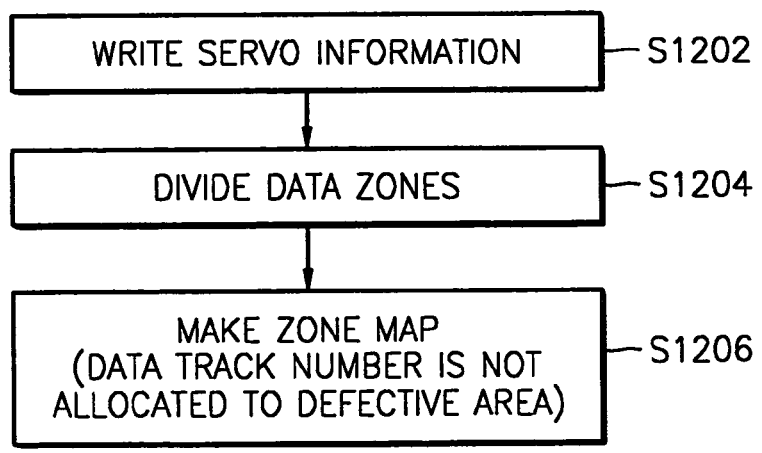
FIG. 12 is a flowchart showing the method of managing defects in a hard disk drive according to a second embodiment of the present invention.

FIG. 12 is a flowchart showing a method of managing defects in a hard disk drive according to a second embodiment of the present invention. Before defect management is performed, in operation S1202, servo information is written on the disk. In this case, a servo track number and a data track number are consecutively set in an entire area of the disk.

In operation S1204, the disk is divided into a plurality of data zones. In operation S1206, a zone map is made so that the data track number is not allocated to an alternate write area.

Specifically, a predetermined area is regarded as the defective area at ID and OD of the disk centering on a track of which the position of defects is known in advance, and the zone map is made so that a data track is not set in the defective area. The defective area is mechanically determined in advance by considering an MR skew of a track of which the position of defects is known in advance and the accuracy of a servo writer when a predetermined area is allocated to the ID and OD of the disk centering on the track of which the position of defects is known in advance.

Figure 13:
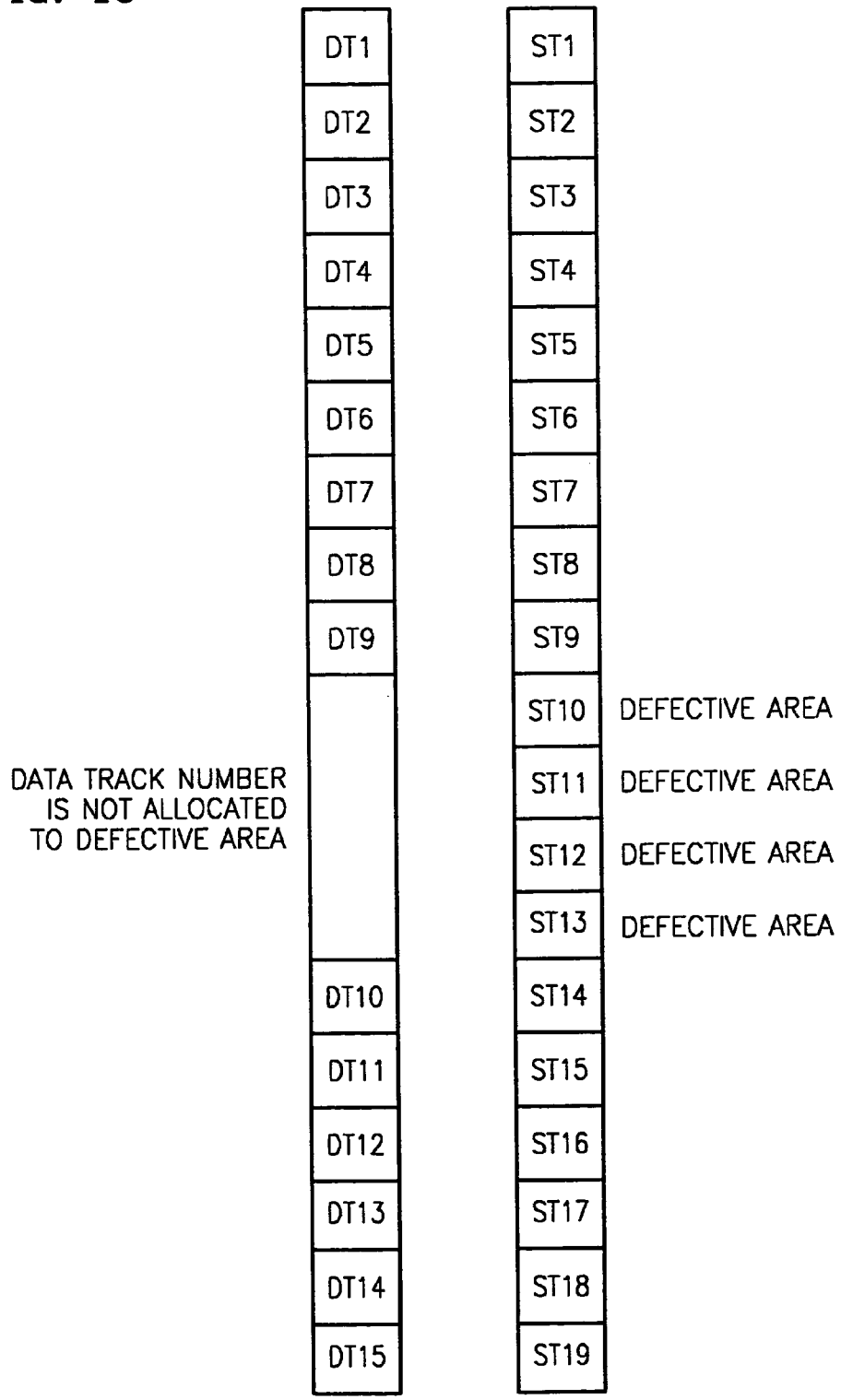
FIG. 13 shows a method of managing a defective zone performed in operation S1206 shown in FIG. 12.

FIG. 13 shows a method of managing a defective zone performed in operation S1206 shown in FIG. 12. In FIG. 13, reference numerals ST1, ST2, . . . , and ST19 denote servo tracks, and reference numerals DT1, DT2, . . . , and DT15 denote data tracks.

In the second embodiment, as shown in FIG. 13, the data track number is not allocated to the defective area. As a result, the servo tracks in the defective area are not used, and data access does not occur in the defective area.

As shown in FIG. 13, ST1, ST2, . . . , and ST9 are in a one-to-one correspondence with DT1, DT2, . . . , and DT9, and ST14, ST15, . . . , and ST19 are in a one-to-one correspondence with DT10, DT11, . . . , and DT15. In addition, no data track number is allocated to ST10-ST13, defective tracks in the defective area.

A correlation between the sector track number and the data track number is written on the zone map. The zone map is stored in a recording medium such as a ROM, or is written in a maintenance cylinder on the disk. In general, the maintenance cylinder is a first cylinder located at the OD of the disk. That is, in the second embodiment, the data track number is not allocated to the defective area on the zone map, and thus, the defective area is not completely accessed. In addition, defect detection is not performed in the defective area in the process for detecting defects. Thus, a time required for the process for detecting defects is greatly reduced.

Figure 14:
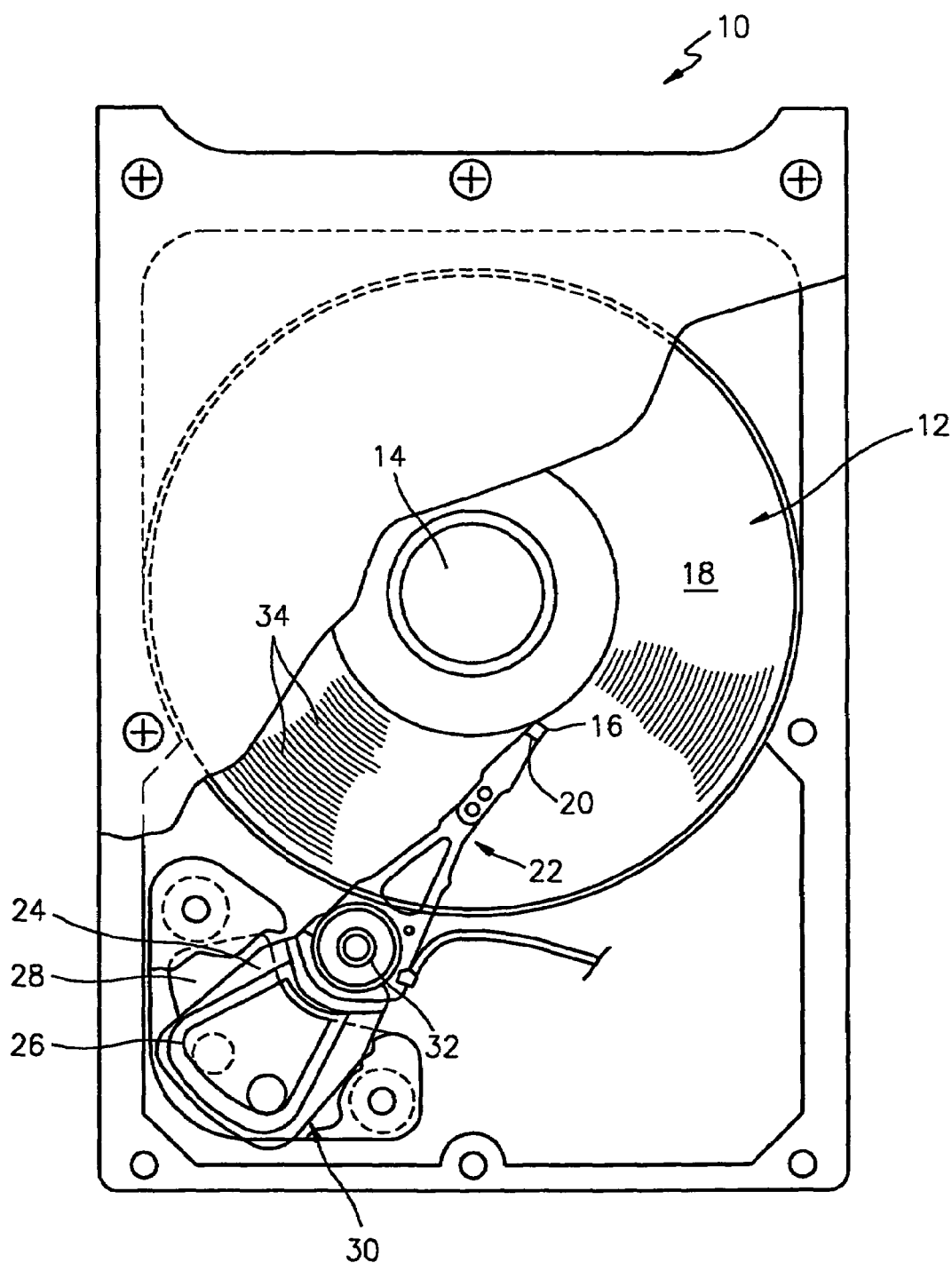
FIG. 14 illustrates a structure of a hard disk drive according to the present invention.

FIG. 14 illustrates a structure of a hard disk drive 10 according to the present invention. The hard disk drive 10 comprises at least one magnetic disk 12 rotated by a spindle motor 14. The hard disk drive 10 further comprises a head 16 located adjacent to a disk surface 18.

The head 16 reads or writes information from or on the rotating disk 12 by sensing and magnetizing a magnetic field of the disk 12. The head 16 is coupled with the disk surface 18. Although a single head 16 is shown, it should be understood that the head 16 comprises a write head for magnetizing the disk 12 and a read head for sensing the magnetic field of the disk 12. In general, the read head includes a magneto-resistive element.

The head 16 may be integrated into a slider 20. The slider 20 generates an air bearing between the head 16 and the disk surface 18. In addition, the slider 20 is coupled with a head gimbal assembly 22 (HGA). The head gimbal assembly (HGA) 22 is attached to an actuator arm 24 having a voice coil 26. The voice coil 26 is located adjacent to a magnetic assembly 28 for specifying a voice coil motor (VCM) 30. Due to a current supplied to the voice coil 26, a torque for rotating the actuator arm 24 with respect to a bearing assembly 32 is generated. The rotation of the actuator arm 24 allows the head 16 to move across the disk surface 18.

Conventionally, information is stored in ring-shaped tracks 34 of the disk 12. In general, each of the ring-shaped tracks 34 includes a plurality of sectors. The head 16 is moved across the disk surface 18 to read information from or write information on another track. Moving a head across another track is generally called a seek routine.

Figure 15:
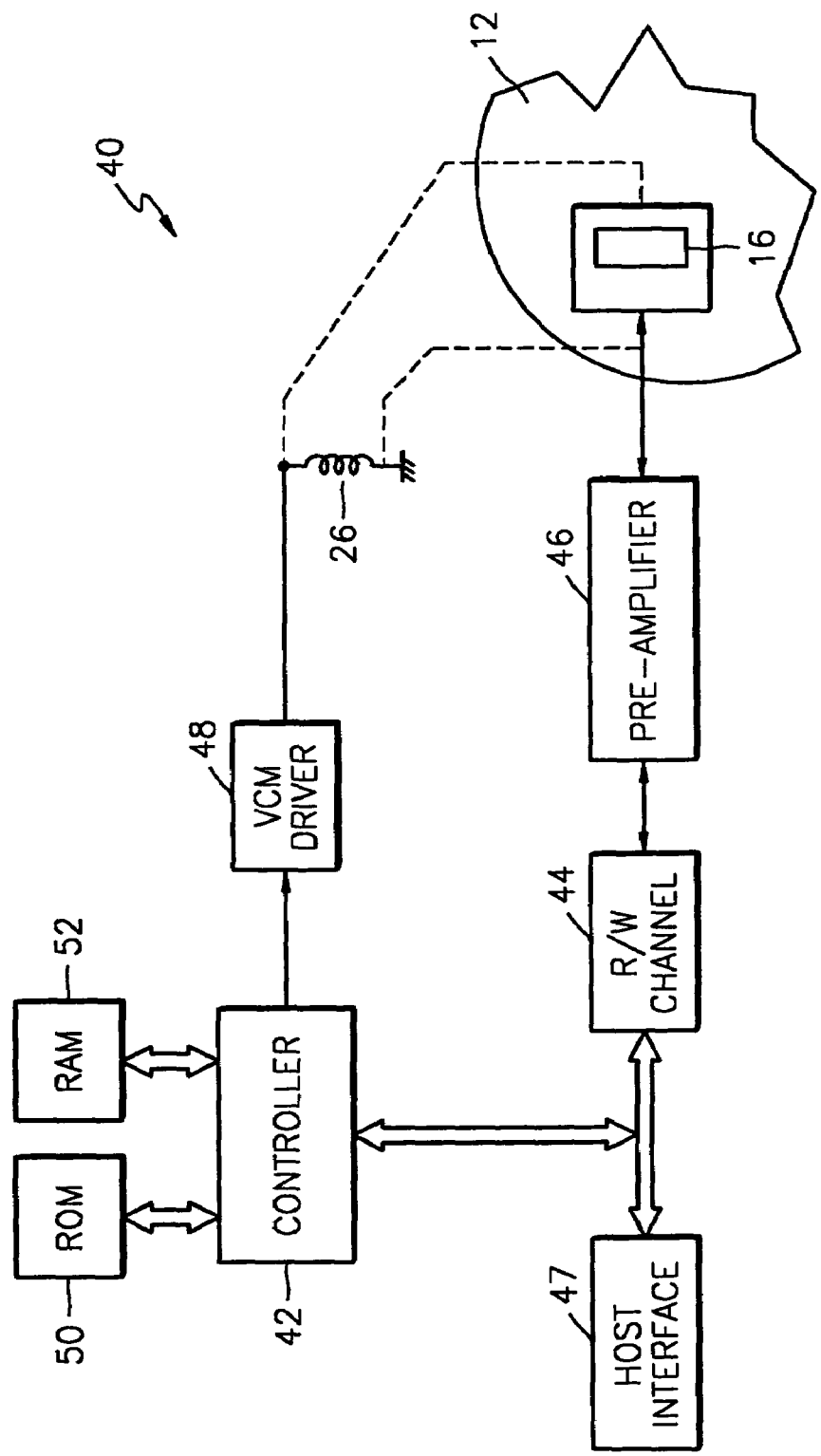
FIG. 15 is a block diagram showing an electrical system which can control the hard disk drive shown in FIG. 14.

FIG. 15 is a block diagram showing an electrical system 40 for controlling the hard disk drive 10 shown in FIG. 14. The electrical system 40 includes a controller 42 coupled with the head 16 by a read/write (R/W) channel 44 and a pre-amplifier 46. The controller 42 includes a digital signal processor (DSP), a microprocessor, and a microcontroller.

The controller 42 supplies a control signal to the R/W channel 44 to read information from or write information on the disk 12. Information is transmitted from the R/W channel 44 to a host interface 47. The host interface 47 comprises a buffer memory and a control circuit for interfacing the hard disk drive with a system such as a personal computer (PC).

The controller 42 is also coupled with a VCM driver 48 for supplying a driving current to the voice coil 26. The controller 42 supplies the control signal to the VCM driver 48 to control the excitation of the VCM 30 and the movement of the head 16.

In a reproduction mode, the R/W channel 44 modulates an analog signal read from the head 16 and amplified by the pre-amplifier 46, into a digital signal that is readable by a host computer (not shown), outputs the digital signal to the host interface 47, receives user data from the host computer via the host interface 47, transforms the received user data into a write current to write the user data on the disk, and output the write current to the pre-amplifier 46.

The controller 42 is coupled with a nonvolatile memory such as a read only memory (ROM) or a flash memory 50 and a random access memory (RAM) 52. The memories 50 and 52 include instructions and data used by the controller 42 to execute a software routine. The software routine includes a seek routine for moving the head 16 from one track to another track. The seek routine includes a servo control routine for guaranteeing to move the head 16 on a correct track.

In addition, code programs used in the flowchart showing the method of writing servo information in a hard disk drive shown in FIG. 5 and code programs used in the flowchart showing the method of managing defects in a hard disk drive shown in FIGS. 10 and 12 are stored in the memories 50 and 52.

The controller 42 writes servo information on the disk according to the flowchart shown in FIG. 5. When recording the servo information on the disk, the controller 42 controls the head 16 to sequentially write the servo information from the OD of the disk to a track having a '0' skew centering on the track having the structural skew '0' and to sequentially write the servo information from the ID of the disk to the track having the '0' skew. That is, after the servo information is sequentially written from a track having a minimum number to the track having the '0' skew, the controller 42 controls the head 16 to sequentially write the servo information from a track having a maximum number to the track having the '0' skew.

In the hard disk drive according to the first embodiment of the present invention, after writing the servo information on a track, the controller 42 allocates a circumference of a track of which position of defects is known in advance to one new data zone according to the flowchart shown in FIG. 10 and forbids a user to access a defective area. The zone map is stored either in the ROM 50 or in a maintenance cylinder of the disk.

In the hard disk drive according to the second embodiment of the present invention, after writing the servo information on the track, the controller 42 does not allocate a data track to a circumference of a track of which the position of defects is known in advance according to the flowchart shown in FIG. 12 and forbids a user to access a defective area. The zone map is stored either in the ROM 50 or in the maintenance cylinder of the disk.

The present invention may be implemented as a method, an apparatus, and a system. When the present invention is implemented as a software unit, elements of the present invention are code segments for performing essential operations. Programs or code segments may be stored in a processor readable medium or transmitted in response to computer data signals coupled with a carrier wave in a transmission medium or communication networks. The processor readable medium includes a certain medium on which information may be stored or transmitted. The processor readable medium may be an electronic circuit, a semiconductor memory device, a ROM, a flash memory, an erasable ROM, a floppy disc, an optical disc, a hard disc, an optical fiber medium, or a radio frequency (RF) network. The computer data signals include certain signals which are transmittable on a transmission medium, such as electronic network channels, optical fibers, air, electronic fields, and RF networks.

As described above, in a method of managing defects in a hard disk drive according to a first embodiment of the present invention, a defective area of which the position is known in advance is managed on a zone map, such that defect detection is not performed in the defective area in a process for detecting defects and a time required for the process for detecting defects is greatly reduced.

In addition, the allowable capacity of defects of a data zone may be kept at a maximum by allocating a circumference of a track of which the position of defects is known in advance to one new data zone and forbidding a user's access in the defective area, instead of reducing the allowable capacity of defects of a data zone by managing the defective area for defects in a spare area.

In the method of managing defects in a hard disk drive according to a second embodiment of the present invention, a data track is not allocated to the defective area, such that data access does not occur in the defective area.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of managing defects in a hard disk drive in a case where a position of defects on a disk is known in advance, the method comprising:

designating a defective area as a data zone including tracks having defects known in advance; and managing the data zone for defects;

wherein the data zone is managed for defects so that a user cannot access the defective area.

2. The method of claim 1, wherein the data zone is managed for defects on a zone map having information comprising at least a recording frequency of the zone and a sector number per track.

3. The method of claim 1, wherein numbers of logical block addresses of the data zone are set to zero so that the defective zone cannot be accessed.

4. The method of claim 1, wherein the defective area is determined by considering an accuracy of a servo writer when the defective area is designated as the data zone including tracks having defects known in advance.

5. A method of managing defects in a hard disk drive in a case where a position of defects on a disk is known in advance, the method comprising:

setting data zones on the disk; and making a zone map which represents a correlation between a servo track number and a data track number in each of the data zones and designating data tracks except for a predetermined number of servo tracks around a defective area including tracks of which the position of defects is known in advance, such that a user cannot access the defective area.

6. The method of claim 5, further comprising storing the zone map in an nonvolatile memory accessed by a controller of the hard disk drive.

7. The method of claim 5, further comprising writing the zone map in a maintenance cylinder of the disk.

8. A computer-readable recording medium which stores a method of managing defects in a hard disk drive in a case where a position of defects on a disk is known in advance, wherein the method comprises:

setting a data area for each zone on a disk and designating a defective area as an additional data zone including tracks of which the position of defects is known in advance; and managing the additional data zone for defects;

wherein the additional data zone is managed for defects so that a user cannot access the defective area.

9. The medium of claim 8, wherein the additional data zone is managed for the defects on a zone map having information comprising at least a recording frequency of the additional zone and the sector number per track.

10. A computer-readable recording medium which stores a method of managing defects in a hard disk drive in a case where a position of defects on a disk is known in advance, wherein the method comprises:

setting data zones on a disk; and making a zone map which represents a correlation between a servo track number and a data track number in each of the data zones and designating data tracks except for a predetermined number of servo tracks around a defective area including tracks of which the position of defects is known in advance, such that a user cannot access the defective area.

11. The medium of claim 10, further comprising storing the zone map in an nonvolatile memory accessed by a controller of the hard disk drive.

12. The medium of claim 10, further comprising writing the zone map in a maintenance cylinder of the disk.

13. A hard disk drive, comprising:

a disk;

a spindle motor which rotates the disk;

a head which writes information on the disk and reads the information from the disk;

a voice coil motor which moves the head; and a controller which controls the voice coil motor to perform a process of setting a data area for each zone on the disk, designating a defective area as an additional data zone including tracks of which a position of defects is known in advance, and managing the additional data zone, for defects;

wherein the additional data zone is managed for defects so that a user cannot access the defective area.

14. The hard disk drive of claim 13, wherein the controller manages the additional data zone allocated to the predetermined tracks around the tracks of which a position of defects is known in advance, for defects on a zone map having information comprising at least a recording frequency of the additional zone and the sector number per track.

15. A hard disk drive, comprising:

a disk;

a spindle motor which rotates the disk;

a head which writes information on the disk and reads the information from the disk;

a voice coil motor which moves the head; and a controller which controls the voice coil motor to perform a process of setting a data area for each zone on the disk, making a zone map which represents a correlation between a servo track number and a data track number in each of the data zones, and designating data tracks except for a predetermined number of servo tracks around a defective area including tracks of which a position of defects is known in advance, such that a user cannot access the defective area.

16. The hard disk drive of claim 15, wherein the controller further performs an operation of storing the zone map in a nonvolatile memory accessed by a controller of the hard disk drive.

17. The hard disk drive of claim 15, wherein the controller further performs an operation of writing the zone map in a maintenance cylinder of the disk.

18. A method of managing defects in a hard disk drive in a case where a position of defects on a disk is known in advance, the method comprising:

determining a defective area in advance by considering a skew of a track having defects known in advance;

designating a defective area as a data zone; and managing the data zone for defects by setting a number of logical block address of the data zone to zero so a host cannot access the data zone.

* * * * *